Patented Feb. 9, 1926.

1,572,766

UNITED STATES PATENT OFFICE.

JOSEPH MARIE ALPHONSE CHEVALIER, PAUL BOURCET, AND HENRI REGNAULT, OF PARIS, FRANCE.

PROCESS FOR THE DISTILLATION OF NATURAL RESINS AND OLEORESINS.

No Drawing. Application filed May 17, 1922. Serial No. 561,746.

*To all whom it may concern:*

Be it known that we, JOSEPH MARIE ALPHONSE CHEVALIER, PAUL BOURCET, and HENRI REGNAULT, citizens of France, and residing in Paris, France, have invented a Process for the Distillation of Natural Resins and Oleoresins, of which the following is a full, clear, and exact description.

The distillation of natural resin was industrially carried out up to this day, according to Deve's process, without important modifications.

This method of distillation in proportion as the temperature rises gives, in addition to a small quantity of water and fluid resin oil, products more and more viscous and colored the relative proportions of which vary with the duration of the heating, its intensity and its rapidity, and leaves, as a final fixed residue, either pitch or carbon.

The rate of distillation and the nature of the products resulting therefrom are quite different when, instead of distilling pure resin, other bodies are added thereto.

In particular, resin has already been distilled in presence of quick lime, soda, zinc powder, without however any marked advantages; it has also been shown that distillation in the presence of various kinds of salts; whether alkali, neutral or acid salts, is not sensibly modified.

The present invention has for its object a process of distillation of natural resins or oleo resins as being the gum of the pine tree, of the Canadian balsam, the balsam of Peru, or colophony, in order to obtain with a smaller elevation of temperature, products different from those given by dry distillation or distillation effected in presence of the bodies used up to now.

This process is essentially characterized by the fact that the distillation of natural resins or oleo resins is carried out in presence of any tribasic acid. Owing to the presence of this tribasic acid, the distillation of natural resins or oleo resins transforms the latter into two liquid products: one, which distills, may be used as a substitute for turpentine oil and may be employed as a carburetting agent for alcohol, the other, which does not distill, is a resin oil having particular properties such as low viscosity and no acidity, or odor, which differentiates it clearly from resin oils which can be obtained by the actual known processes of distillation, which latter resin oils are viscous, acid and odoriferous.

By way of explanation, a method of carrying out the present process will now be given.

To the natural resins or oleo resins as being the gum of the pine tree, of the Canadian balsam tree and of the balsam tree of Peru, colophony is added from 1 to 5% of a concentrated tribasic acid, preferably concentrated phosphoric acid and the natural resins or oleo resins is distilled over a flame; the temperature is progressively raised until the vapors reach about 310° centigrade.

The distillation, carried out in these conditions, gives approximately:

48% of a light oil which is distilled and condensed, capable of being used as a substitute for turpentine oil.

45% of a residue composed of a reddish fluid oil with greenish reflections, having a low viscosity and without acidity or odor, and 5% of acid water. Water containing acid is distilled with the light oil and is then condensed and separated.

Our process of distillation offers the main following advantages:

1. High rate of distillation.
2. Use of apparatus of small weight the cost of which for construction, erection and heating is less than that of the apparatuses now employed for obtaining resin oil.
3. Production of a volatile liquid capable of replacing turpentine oil in numerous applications.
4. Utilization of this liquid wholly or partly, for carburetting alcohol.
5. Production of a new resin oil which need not be distilled again and possessing particular properties and qualities.
6. Transformation of dry resinous products into liquid products with yields greater than those capable of being obtained by the former processes.

It is to be understood that the proportions above indicated are given by way of example only and may be modified according to applications.

Claims—

1. A process for the distillation of a natural resin which comprises mixing therewith from 1 to 5% of tribasic phosphoric acid and distilling the mixture, wherein the temperature of the mixture is raised progressively until the temperature of the vapors during distillation reaches approximately 310° centigrade.

2. A process for the distillation of a natural resin which comprises mixing therewith from 1 to 5% of tribasic phosphoric acid, and disitlling the mixture at a temperature of 310° centigrade.

The foregoing specification of our process for the distillation of gem and colophony signed by us this 3d day of May 1922.

JOSEPH MARIE ALPHONSE CHEVALIER.
PAUL BOURCET.
HENRI REGNAULT.